(12) United States Patent
Zimmer et al.

(10) Patent No.: US 9,098,300 B2
(45) Date of Patent: Aug. 4, 2015

(54) PROVIDING SILICON INTEGRATED CODE FOR A SYSTEM

(71) Applicant: INTEL CORPORATION, Santa Clara, CA (US)

(72) Inventors: Vincent J. Zimmer, Federal Way, WA (US); Bin Xing, Hillsboro, OR (US); Scott H. Robinson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 13/935,767

(22) Filed: Jul. 5, 2013

(65) Prior Publication Data

US 2014/0013095 A1  Jan. 9, 2014

Related U.S. Application Data

(63) Continuation of application No. 12/823,343, filed on Jun. 25, 2010, now Pat. No. 8,522,066.

(51) Int. Cl.
| | |
|---|---|
| *G06F 1/00* | (2006.01) |
| *G06F 9/44* | (2006.01) |
| *G06F 11/07* | (2006.01) |
| *G06F 11/10* | (2006.01) |
| *G06F 21/14* | (2013.01) |
| *G06F 21/57* | (2013.01) |

(52) U.S. Cl.
CPC ............ *G06F 9/4401* (2013.01); *G06F 11/073* (2013.01); *G06F 11/076* (2013.01); *G06F 11/1092* (2013.01); *G06F 21/14* (2013.01); *G06F 21/572* (2013.01); *G06F 21/575* (2013.01)

(58) Field of Classification Search
CPC ....... G06F 1/10; G06F 9/4401; G06F 11/073; G06F 11/076
USPC .......................................................... 713/503
See application file for complete search history.

(56) References Cited

U.S. PATENT DOCUMENTS

| | | | |
|---|---|---|---|
| 6,305,009 B1 | 10/2001 | Goor | |
| 6,564,318 B1 | 5/2003 | Gharda et al. | |
| 6,715,019 B1* | 3/2004 | Benson et al. ................ | 710/305 |
| 6,754,828 B1 | 6/2004 | Marisetty et al. | |
| 7,093,116 B2 | 8/2006 | Chen et al. | |

(Continued)

FOREIGN PATENT DOCUMENTS

CN  101441566 A  5/2009

OTHER PUBLICATIONS

Mzidi et al, The 80×86 IBM PC and compatible computers (vols. I & II) Assembly language, design, and interfacing, 2003, 4th ed vols. I & II.*

(Continued)

*Primary Examiner* — Jaweed A Abbaszadeh
*Assistant Examiner* — Austin Hicks
(74) *Attorney, Agent, or Firm* — Trop, Pruner & Hu, P.C.

(57) ABSTRACT

In one embodiment, a semiconductor integrated code (SIC) may be provided in a binary format by a processor manufacturer. This SIC may include platform independent code of the processor manufacturer. Such code may include embedded processor logic to initialize the processor and at least one link that couples the processor to a memory, and embedded memory logic to initialize the memory. Other embodiments are described and claimed.

19 Claims, 8 Drawing Sheets

(56) References Cited

U.S. PATENT DOCUMENTS

| | | | |
|---|---|---|---|
| 7,103,529 | B2 | 9/2006 | Zimmer |
| 7,661,006 | B2 | 2/2010 | Abou-Emara et al. |
| 7,673,126 | B2 | 3/2010 | Zimmer |
| 2004/0049669 | A1 | 3/2004 | Schelling et al. |
| 2004/0128494 | A1 | 7/2004 | Zimmer et al. |
| 2004/0236960 | A1 | 11/2004 | Zimmer et al. |
| 2004/0267708 | A1 | 12/2004 | Rothman et al. |
| 2006/0179308 | A1 | 8/2006 | Morgan et al. |
| 2007/0088939 | A1 | 4/2007 | Baumberger |
| 2007/0250691 | A1 | 10/2007 | Cool et al. |
| 2007/0283137 | A1 | 12/2007 | Ueltschey et al. |
| 2008/0072027 | A1 | 3/2008 | Zimmer et al. |
| 2008/0077783 | A1* | 3/2008 | Lu et al. .......................... 713/1 |
| 2008/0091917 | A1 | 4/2008 | Dixon |
| 2008/0120499 | A1 | 5/2008 | Zimmer et al. |
| 2009/0063835 | A1 | 3/2009 | Yao |
| 2009/0182995 | A1 | 7/2009 | Muir |
| 2009/0222653 | A1 | 9/2009 | Findeisen et al. |
| 2009/0319806 | A1 | 12/2009 | Smith |
| 2010/0241809 | A1 | 9/2010 | Ageishi |

OTHER PUBLICATIONS

European Patent Office, Office Action mailed Apr. 10, 2013 in European Patent application No. 11169087.1.

The State Intellectual Property Office of the People's Republic of China, Office Action and Search Report mailed Jul. 22, 2013 in Chinese application No. 201110188572.3.

Japanese Patent Office, Office Action mailed Feb. 5, 2013 in Japanese application No. 2011-141162.

Patent Cooperation Treaty, International Searching Authority, "Notification of Transmittal of the International Search Report and the Written Opinion," in international application No. PCT/US2011/040263, mailed Feb. 9, 2012.

European Patent Office, Partial European Search Report mailed Nov. 29, 2011 in European application No. 11169087.1.

Song, Zong-Yu et al. "Predicate Elimination Technique in Binary Translation for IA-64 Architecture," 2006, 4 pages.

Intel Corporation, "Intel platform Innovation Framework for EFI Pre-EFI Initialization Core Interface Specification (PEI CIS), Version 0.9," Sep. 16, 2003, pp. 1-196.

Intel Corporation, "Overview of Intel QuickPath Interconnect System Initialization," 2009, pp. 1-13.

Ravi, et al., "Tamper Resistance Mechanisms for Secure Embedded Systems," 2004, IEEE, 17th International Conference on VLSI Design, all pages.

* cited by examiner

10

| SIC | | | |
|---|---|---|---|
| IPL 20 | ECL 30 | EML 40 | Reserved Logic 50 |

FIG. 1

PROVIDING SILICON INTEGRATED CODE FOR A SYSTEM

This application is a continuation of U.S. patent application Ser. No. 12/823,343, filed Jun. 25, 2010, the content of which is hereby incorporated by reference.

BACKGROUND

Historically, basic input/output system (BIOS) software, which is low level software used to boot up and perform low level operations in a computer system, has typically been incorporated by so-called original equipment manufacturers (OEMs), namely the computer manufacturers. To provide BIOS support for processors, a processor manufacturer (so-called silicon manufacturer) provides detailed information to the OEMs. This information is typically in the form of source code. However, by providing this code hardware intellectual property (IP) aspects of the processor, such as how to program it and underlying hardware details are exposed to third parties. Further, by providing source code, the OEMs can modify the code, integrate it in a non-standard manner, or tweak it to support non-standard hardware which can raise complexity and operating concerns, leading to added support costs for the silicon manufacturer.

Examples of information typically provided to initialize a system include details regarding a processor, interconnect links, memory fabric, and so forth. Such details may include register definitions and interfaces to this hardware. This information is distributed, in addition to OEMs, to independent BIOS vendors (IBV's). While the universe of IBVs and OEMs for x86 computer systems is relatively small, as processors and other advanced silicon controllers are incorporated into different types of systems and devices, this universe is expected to expand greatly, raising more IP concerns and support challenges.

BRIEF DESCRIPTION OF THE DRAWINGS

FIG. 1 is a block diagram of the components of platform independent silicon integrated code (SIC) in accordance with one embodiment of the present invention.

DETAILED DESCRIPTION

Figure 2:
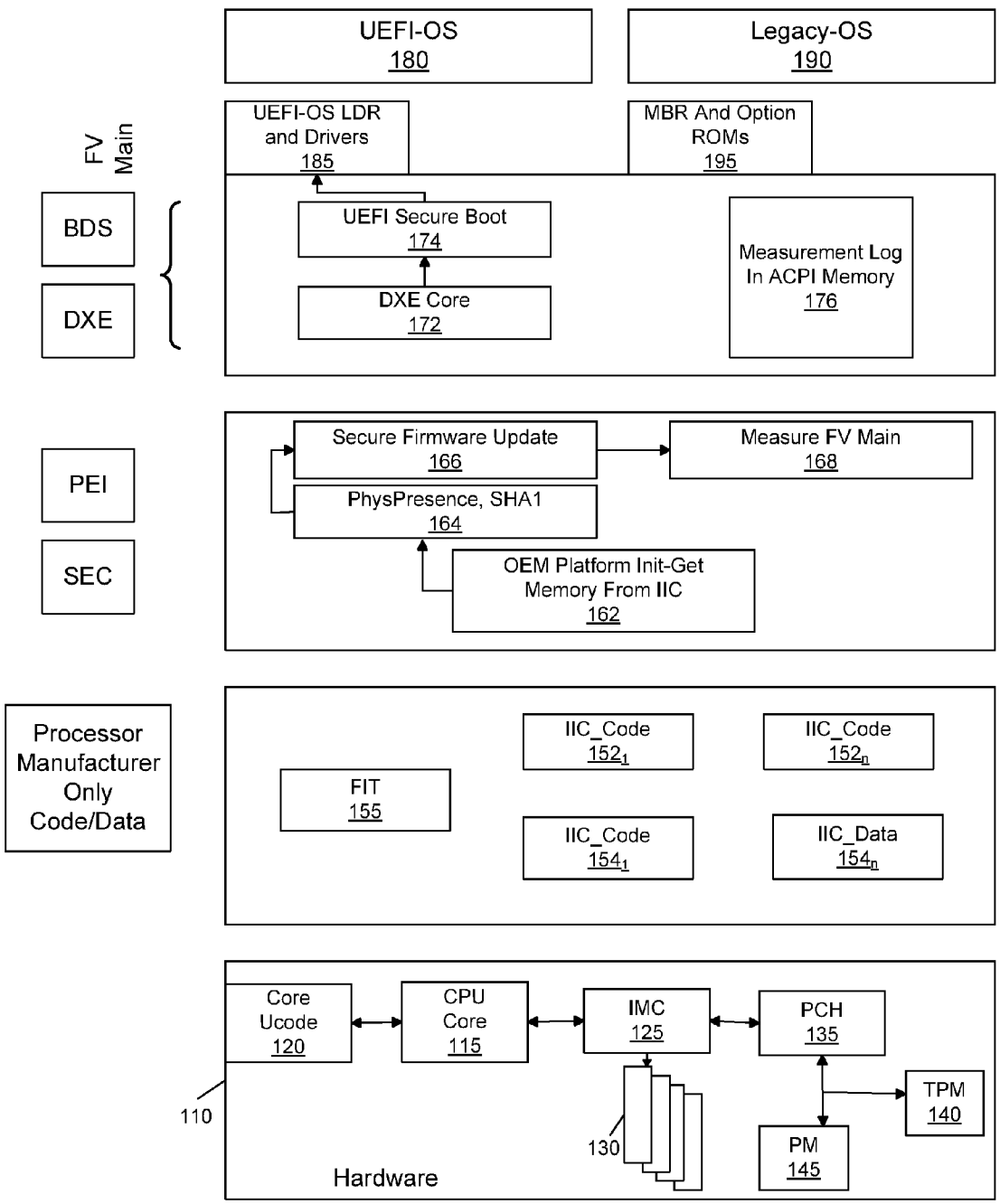
FIG. 2 is a block diagram of a system in accordance with an embodiment of the present invention.

In various embodiments, early initialization software can have a tightly coupled binding to underlying processor hardware such that the silicon manufacturer controls and provides early initialization software, rather than it being implemented by OEM BIOS.

This silicon integrated code (SIC) may be used in an environment to load the code, guarantee its provenance and after execution of the SIC, hand control off to OEM BIOS in a seamless fashion. The SIC may be used to perform low level aspects of memory initialization such as training, in which analog links are set up, diagnostics and design for test hooks. While the scope of the present invention is not limited in this regard, key initialization code for memory controller and interconnect links, as well as potentially runtime support for various processor and system features may be in the form of SIC. In some embodiments, a root of trust to this code can be provided via a hook in processor microcode to implement a SIC loader to authenticate and then load the SIC, which may be a form of silicon manufacturer's BIOS, and then pass control to the OEM BIOS. Given the challenges of upgrade to an OEM BIOS, a memory storing the BIOS such as a firmware volume incorporated in a flash memory could be hostile, so a root of trust for core microcode within the processor package to launch the SIC loader may be used to guarantee that those subsidiary blocks of the OEM BIOS that include the SIC are valid.

After execution of the SIC, control may pass to an OEM BIOS which may be implemented according to a Unified Extensible Firmware Interface (UEFI) open source core (e.g., of the UEFI Specification Version 2.0 (dated Feb. 21, 2006)), or implemented via Open Firmware Institute of Electrical and Electronics Engineers (IEEE) 1275-1994, or via a conventional BIOS or proprietary OEM boot code, each of which boots one or more operating systems (OSs). In some implementations, the SIC may be used to perform patches, e.g., to resolve errors or to perform binary translation. Also, the SIC may be able to set protections for certain memory blocks, e.g., to hide a memory block for binary translation, error handling, or other code of a silicon manufacturer that is to run during runtime and be invisible to the OS. In this way, where a processor uses reserved code, such as for microcode read only memory (uROM) offload, co-processor support, etc., having the SIC provide this memory prior to exposing the machine to third party OEM code allows for a subset of the memory to be available to the processor.

In various embodiments, the SIC may be provided as binary code for incorporation into an OEM BIOS, e.g., as a flash or other non-volatile memory, or the SIC can be implemented in non-volatile storage of a processor package. Thus, embodiments enable a processor or other silicon manufacturer to ship binary modules to customers, rather than source code, providing greater IP protection. Further with a growing number of customers, technical support costs can be reduced by shipping BIOS building blocks together with silicon.

Figure 1:
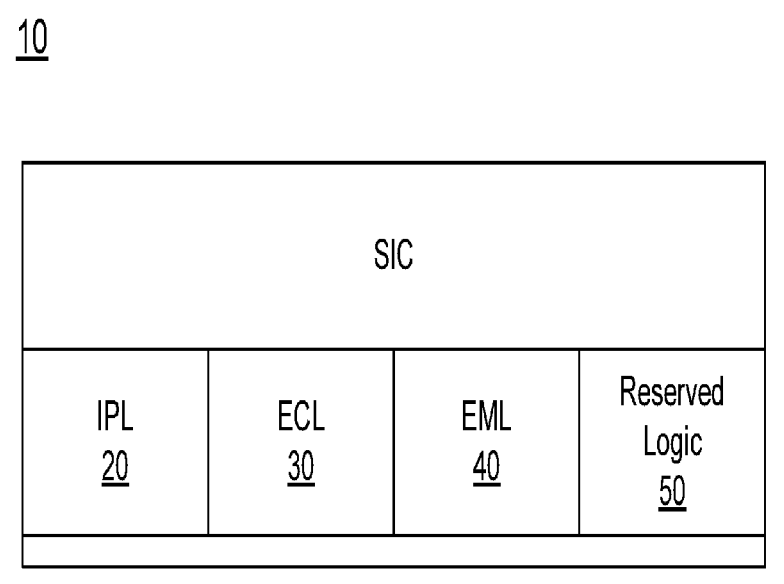

FIG. 1 is a block diagram of the components of a platform independent BIOS in accordance with one embodiment of the present invention that can be incorporated in a SIC. By platform independent, it is meant that the components included are to be executed on any given platform, regardless of the specifics of the machine (e.g., memory types, link speeds, voltages available, etc.). Instead, as will be described below, anything that may be platform dependent can be codified through a platform manufacturer data file. As an example, the platform vendor may parameterize certain information such as information regarding the system board and so forth. Certain components doing fundamental initializations (e.g., a link initialization establishing root of trust) can be done by the SIC before handing control to third party code. This temporal isolation of the SIC provides a guarantee that the processor owns the hardware at power on reset and only SIC code can run until control is given to third party code.

As seen in FIG. 1, the SIC components may include an initial program loader (IPL) 20, which is responsible for locating and loading the rest of the SIC before third party code. Note that this loader may not be considered a component of the SIC. The components of the SIC may be transitory or persistent. For a persistent one, it could be active (acting like a platform initialization (PI) module) or passive (acting like a library, through new instructions).

In the embodiment of FIG. 1, SIC 10 includes an embedded central processing unit (CPU) logic (ECL) 30, which initializes inter-processor logics such as on-board interconnects. Training for both link and memory initialization may include communication between both ends of the link. In the case of a link, a processor may be coupled to another processor or an input/output (IO) hub, and can determine the optimal frequency and link widths at which they can transact data. This ECL module may typically be transitory. In some embodiments, link initialization may be redone without damaging memory contents in a resume operation from a low power state (e.g., an Advanced Configuration and Power Interface (ACPI) low power state, e.g., S3 of the ACPI Specification Version 4.0 (Jun. 16, 2009)).

SIC 10 may further include an embedded memory logic (EML) 40 to initialize memory. This component may be partially transitory and partially persistent during runtime (e.g., for handling temperature throttling or error handling). Memory initialization may further include setting up addressing, as different components have different views of memory. For example, the CPU may have a processor physical address, the dynamic random access memory (DRAM) may have a DRAM physical address, and in some embodiments there may be a platform physical address. Thus there can be different views of memory depending on how link address decoders are programmed. To enable an amount of sequestered memory for the processor, a subset of the address decoders and memory decoders may be programmed for the processor. This sequestered memory may be exclusively used by the processor during system operation, and may store microcode offload, a binary translator, licensing information, manageability information and so forth. In addition a reserved logic 50 may be used to support other features of a platform independent logic. While shown in the embodiment of FIG. 1, understand the scope of the present invention is not limited in this regard.

Referring now to FIG. 2, shown is a block diagram of a system in accordance with an embodiment of the present invention. System 100 shown in FIG. 2 includes both hardware and various layers of software. Note also that the hardware implementation shown is at a representative high level, and many more components will be present in a given system. Furthermore, while the software portions are shown as various components in different locations, understand that particularly the SIC portion can be present in different locations in different embodiments.

With regard to the underlying hardware of the system, hardware 110 may include various components including one or more processors, memories, input/output devices and so forth. However, for ease of illustration only a few such components are shown in the embodiment of FIG. 2. Specifically, shown is a processor core 115 and corresponding microcode 120 for execution on the core. In various embodiments, core 115 may be representative of a plurality of cores of a multi-core processor, each of which may include its own microcode store. In addition, in many implementations a processor package may further include an integrated memory controller (IMC) 125 that in turn can couple with a system memory 130, which in one embodiment may be formed of a plurality of dual in-line memory modules (DIMMs) such as double data rate (DDR)-3 DIMMs. As further seen, IMC 125 may be coupled to a peripheral controller hub (PCH) 135 that in turn can couple to other devices such as a trusted platform module (TPM) 140 and a peripheral module 145. While the scope of the present invention is not limited, the interconnection of various devices to PCH 135 may be via a low pin count (LPC) bus. While shown with only these limited components, understand that many more components may be present in different implementations.

Tightly coupled to the processor hardware may be a SIC module 150. In various implementations, the SIC module may be implemented in a non-volatile storage such as a flash memory, which may be present within a processor package. Alternately, the SIC module may be provided as a binary from the processor manufacturer to an OEM, which incorporates it into its BIOS. Thus note that the actual location of the SIC can vary in different implementations. In one embodiment, the SIC may be part of an OEM BIOS, e.g., integrated into a flash device affixed to the motherboard. For ease of illustration, however SIC module 150 is shown as a separate code block. Specifically, the module is shown to include multiple SIC code revisions $152_1$-$152_n$. That is, as will be discussed further below, the SIC may be updated in the field. In addition to code, various data blocks $154_1$-$154_n$ may be present in the SIC module. In one embodiment, silicon manufacturer policy can be incorporated in such SIC data blocks and which may be based upon a stock keeping unit (SKU). Such information may include voltage and temperature ratings to indicate part grading, supported features, and/or thermo-physical silicon properties. To access these various code and data blocks, a firmware interface table (FIT) 155 may be provided. Note that the code and data blocks may be protected by key pair structures. Note that in various embodiments, SIC 150 can be cryptographically bound to the hardware and launch is mediated by core microcode 120.

Additional system software may be in the form of OEM BIOS, including pre-boot code in accordance with a UEFI standard. Such code may be stored in various firmware volumes and may include security initialization code (SEC), pre-EFI (PEI) code, and driver execution environment (DXE) and boot device select (BDS) code. As a logical illustration, such code may be segmented into a first code module 160 and a second code module 170. A firmware volume is a logical partitioning of a non-voltage memory that may include BIOS and other low level software. In general, modules 160 and 170 each may be a firmware volume having third party extensible code. The first code module 160 may be used to perform OEM platform initialization and obtain a memory aperture from the SIC code (block 162). Control may then pass to a code block 164 to perform physical presence analysis and to perform secure hash operations, which in turn may enable a secure firmware update mechanism 166 to be performed, prior to making any measurement of the main firmware volume 168. If all of these authentication checks pass, control passes to second code module 170, which may include a DXE core, and may execute a UEFI secure boot module 174, e.g., using a measurement log 176 stored in ACPI memory. Then OS loader and drivers 185 may be executed that in turn load an OS 180, which may be a UEFI-compliant OS. In other implementations, a legacy OS 190 may be implemented via one or more option ROMs 195.

The implementation of an SIC initial program loader may depend on the approach chosen to bind the SIC into the platform, as detailed below. In one embodiment, a patch at reset (P@R) operation may occur, in which once the processor processes the patch, core microcode or other logic in the CPU may locate the SIC section in the CPU flash or OEM flash; or it could launch via a core patch within an Initial Program Load (IPL) logic to launch the SIC. In the case the SIC is sitting outside of the CPU or a CPU-authenticated element, an authentication can be done to validate the SIC binary before loading.

Figure 3A:
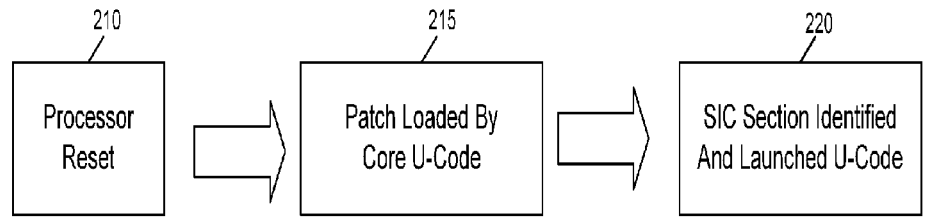
FIG. 3 is a flow diagram for a launch of a silicon integrated code in accordance with one embodiment of the present invention.

Referring now to FIG. 3A, shown is a flow diagram for a launch of an SIC in accordance with one embodiment of the present invention. As shown in FIG. 3A, operation may begin at processor reset (block 210). Very minimal low level operations may be performed by the processor responsive to a reset, which may be received by the processor via a reset signal. Next, a patch may be loaded by core microcode (block 215). Core microcode may access the firmware interface table having a FIT pointer that can point to a core microcode patch. In some embodiments, the table can point to the IPL. In one embodiment the patch may be stored in an OEM flash, which may also include the FIT. Each entry of the table points to a give code location. After loading of this patch, the SIC may be identified and launched via core microcode (block 220).

Figure 3B:
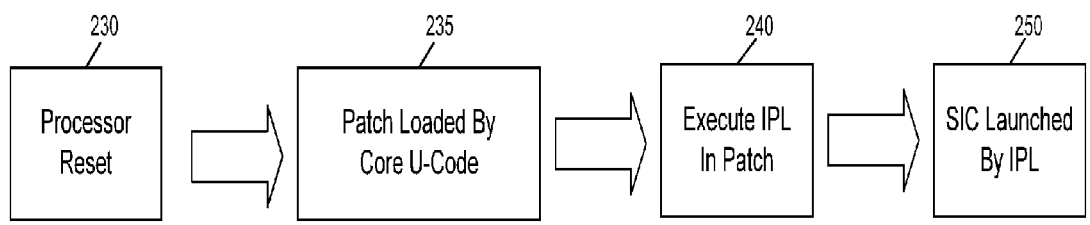

In a different implementation, a patch may include the IPL. The IPL may be validated as part of the core patch load, and then it can do its own integrity mechanism, such as a separate key pair to validate the SIC. In one embodiment, the IPL may be part of core microcode. Accordingly, as shown in FIG. 3B, after processor reset (at block 230) and patch loading (at block 235), execution of the patch may occur, which includes the IPL (block 240) that in turn launches the SIC (block 250).

Figure 4A:
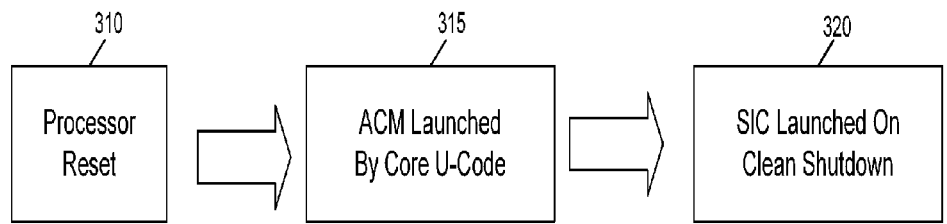
FIGS. 4A and 4B are flow diagrams of launching of the SIC in accordance with another embodiment of the present invention.
Figure 4B:
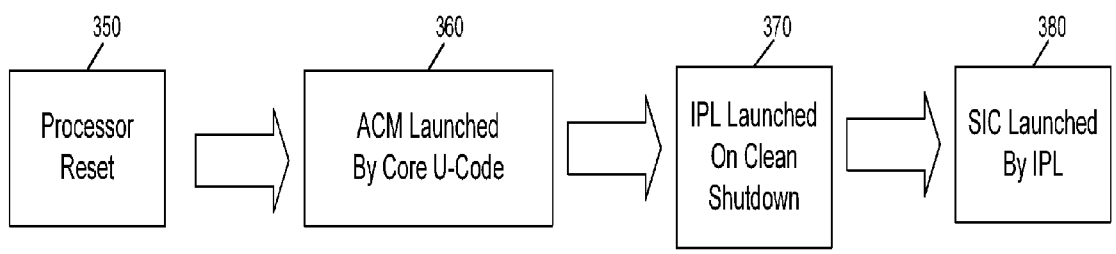

In another implementation, an authenticated code module (ACM) is launched at processor reset to check proper shutdown and/or zeroing memory out before launching BIOS code. These operations may include performing a hash in the OEM BIOS, and accessing a TPM by an authenticated code module. Such ACM could embed the SIC or an IPL and let it find the SIC, e.g., within a third party BIOS (e.g., a flash device of the motherboard). Thus in other implementations, the SIC may be launched from an authenticated code module. As seen in FIG. 4A, which is a flow diagram of launching of the SIC in accordance with another embodiment of the present invention, after processor reset at block 310, an ACM may be launched by core microcode (block 315). In turn, the SIC may be launched on clean shut down of the ACM (block 320). In yet another implementation, an IPL may be provided that is launched on clean shut down of the ACM. Thus as shown in FIG. 4B, after processor reset (block 350), the ACM is launched (block 360) and then on clean shut down of the ACM, the IPL may be launched (block 370), in turn launching the SIC (block 380).

At the conclusion of SIC execution, control may pass to BIOS (of which the SIC may be a part). For example, control may pass to a reset vector of the machine, and a FIT entry may be accessed by the SIC to start running OEM BIOS at a PI module, via a UEFI entry point.

Figure 5A:
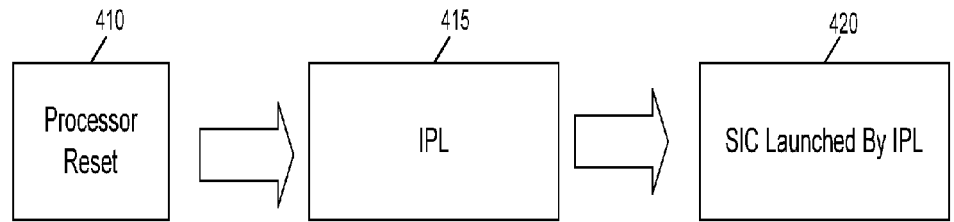
FIGS. 5A and 5B are flow diagrams of launching of the SIC in accordance with yet another embodiment of the present invention.
Figure 5B:
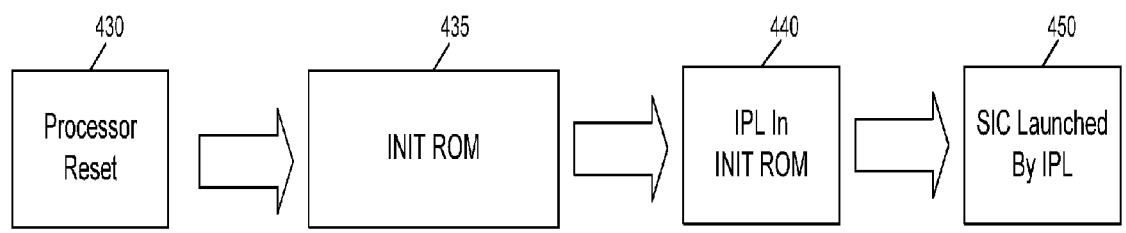

In some implementations, available PI code may be used to execute a SIC. As an example, a "SEC" module may be renamed as "SIC_IPL" logically, without any hardware modification. This is shown in FIG. 5A, in which at processor reset (block 410), an IPL is launched (block 415), and which in turn launches the SIC (block 420). The other way is to embed SIC into an initialization ROM (INIT ROM). That is, flash is ultimately not mapped into third party BIOS or OS address space. This is shown in FIG. 5B in which at processor reset (block 430) an INIT ROM is executed that includes an IPL that launches the SIC (blocks 435, 440 and 450). In yet other implementations, an independent SIC launch may be performed using processor-based code, e.g., by either PI SEC or INIT ROM.

In the "SEC" case, authentication may be performed after launching the SIC. In other words, this approach implies a BIOS boot block as the core root of trust (CRTM). The security considerations of this model include ensuring the integrity of the SIC, namely that the provenance of the binary is with the silicon manufacturer. Binding the SIC into the authenticated code module or the patch is one mechanism, leveraging the integrity cover already used in those binaries. Alternately, another model is to integrate the SIC_IPL into the aforementioned entities. The SIC_IPL would be responsible for doing the ensuing integrity check of the SIC, but the extant logic of an errata patch loaded at reset, a BIOS ACM, INIT ROM, or other reset-time executable, would be decoupled from the SIC. This may allow for an upgrade mechanism in which the SIC may change at a different cadence from the former binary entities. Note that this decoupling does not imply there can be an ad hoc mixture of various revisions of the SIC_IPL host module and successive SIC instances, though. Rather, the tuple (SIC_IPL host, SIC) may be validated together such that only supported revisions of the SIC_IPL host and SIC's are supported via update so that rollback and other attacks are not exposed via un-validated combinations.

To enable a silicon manufacturer control of early initialization, various data modules may be present. In one embodiment, an overall SIC data module may be associated with an SIC and include data provided by the processor manufacturer, the OEM, and an end user. Thus in addition to processor manufacturer data, as described above an SIC platform data encoding (PDE), namely a data structure created by a platform manufacturer (PM) and bound into the system board, may be accessed. In one embodiment, the PDE can include but is not limited to the UEFI PI Platform Configuration Data (PCD), for example, referenced by a firmware interface table (FIT) entry. The PDE may provide power management (PM) policy and non-discoverable, board-specific information. Platform data encoding may provide details about how a processor is incorporated into a board such as whether the board is a fanless design. This information can include the frequency mode settings desired by the vendor, routing of certain system management bus (SMBUS) addresses for the serial presence detect (SPD) EEPROM's on the memory DIMM's, etc.

The information possible can be such that the SIC will fail safely in the case of errant information in the PDE, such as via vendor mistakes or malware attacking the ROM. Another model would be a trusted PDE, such as having a silicon manufacturer tool at the PM facility take the PM input and use remote silicon manufacturer servers to sign the PDE and return it to the PM for successive integration into the platform.

In addition to the PDE, there may be some post-ship settings to be conveyed to the SIC. These are typically changes that the platform owner (PO) effects. The specific data encoding and store may be referred to as the owner data encoding (ODE). The ODE may have different locations in different systems, such as a trusted computing group (TCG) TPM non-volatile (NV) data location with an NV index reserved for the SIC or some other owner-authorized location. The type of data that may be in the ODE can include owner choices, such as memory interleave, feature enable/disable (e.g., simultaneous multithreading (SMT)). A similar argument inheres for trust with respect to the ODE, namely the SIC should fail safely in the case of a malicious or errant owner update to the ODE.

While the above discussion focuses on an initialization time SIC, embodiments may also enable the SIC to be used during runtime, e.g., especially for high availability servers for purposes of reliability-availability-serviceability (RAS). Specifically, certain operations that occur during boot/initialization time, such as link initialization and memory initialization code may occur again at runtime. Imagine the hot-add of memory or an IOH/CPU. This runtime activity may be expressed wholly in ACPI machine language (AML) flows such that the OS power management (OSPM) code can execute the action without firmware complicity. But in practice, a lot of these flows use system management mode (SMM) assists. The SMM implementations are handlers that complement ACPI and chipset actions to accomplish the action, such as re-initialization of memory via the hot-add of a DIMM. This entails having the SIC at runtime, but since the SMM handlers are under control of the OEM's, the IP entailed in memory initialization would be shared with the OEM, whether it be via documentation such that they can write their own handlers, or via source code, such that they can integrate the logic into their SMM flow. Instead using embodiments of the present invention, the SIC may be performed at runtime to avoid such disclosures.

Figure 6:
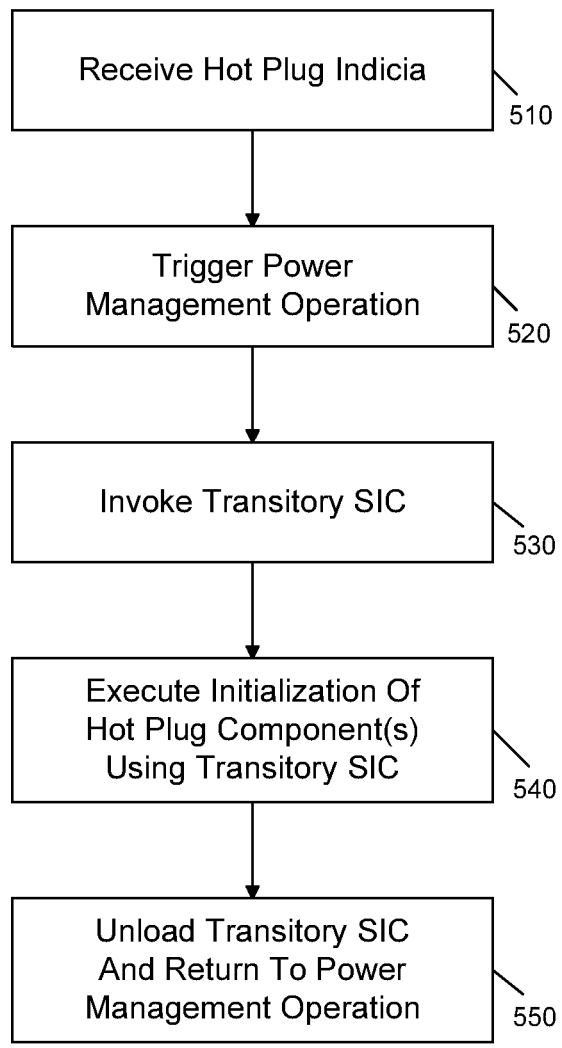
FIG. 6 is a flow diagram of a method for performing runtime SIC execution in accordance with an embodiment of the present invention.

Referring now to FIG. 6, shown is a flow diagram of a method for performing runtime SIC execution in accordance with an embodiment of the present invention. FIG. 6 is shown in the context of a runtime operation on a high availability system that provides for dynamic changes to the system such as a hot add operation. Furthermore, understand that method 500 of FIG. 6 can be used in the context of an ACPI flow in which control typically passes to an SMM context to perform certain tasks for handling an ACPI request.

As seen in FIG. 6, method 500 may begin by receiving a hot plug indication (block 510). Such hot plug indicia may be an indication that a new component is to be incorporated into the system. Such component may be a new processor of a multiprocessor system, additional memory or so forth. Furthermore, while the embodiment of FIG. 6 is in the context of a hot plug operation, embodiments may be equally applicable to other dynamic changes to a system, such as a removal event, a fail over event or other such operations. On receipt of the hot plug indicia, a power management operation may be triggered to handle the hot plug event (block 520). This power management operation may be an ACPI-implemented operation such as according to an ACPI AML flow. Conventionally, such flow would trigger a SMM event to handle various tasks to be performed in the course of the hot plug event such as initializations and so forth. Because SMM mode is implemented by a given OEM, the OEM however would need access to the underlying IP, e.g., of the silicon manufacturer.

Accordingly, in various embodiments instead the power management operation may include code to invoke a transitory SIC (block 530). This transitory SIC may perform various tasks, including initializations and so forth that would otherwise be performed in SMM. More specifically, as shown in block 540, the SIC may execute initialization, e.g., of the hot plug components, based on one or more FIT entries and input from the power management operation. For example, the ACPI AML may provide various input information. In one embodiment, in an ACPI flow an interpreter can access the FIT table or include a routine SIC module in the ACPI name space to provide temporal isolation. In other embodiments, ACPI can invoke a CPU driver register for a call back and then invoke the SIC to do a patch mode, or where the SIC model is an authenticated code module, execute via an EnterAccs instruction.

Using ACPI AML, reads or writes to memory or IO locations can be performed, so in one embodiment a synthetic peripheral device address can be synthesized in a chipset to indicate the mode. In this situation the AML believes it is communicating with part of the chipset and then the chipset actually invokes the SIC. Another approach is that when early transitory SIC code is run, it could be stored in sequestered memory and then be re-invoked through this synthetic peripheral device and not have to be reloaded. Thus in different embodiments, either persistent SIC code may be executed or a transitory SIC code execution may occur in response to the indicia.

After execution of the initialization and other operations, the transitory SIC may be unloaded and control may return to power management operation (block 550). Such power management operation, e.g., continued execution of the ACPI AML flow, may occur to ready the system for the additional components added. While shown with this particular implementation in the embodiment of FIG. 6, the scope of the present invention is not limited in this regard.

Runtime SIC (RT_SIC) operation as just described is distinguished from the above-described SIC which runs from the reset vector (and can also be referred to as boot-time SIC (BT_SIC) for purposes of this discussion. RT_SIC can have a distinguished IPL process similar to SIC_IPL. The processor may validate the correct SIC module to ensure that the contents of SIC are opaque to the system board builder. To that end, at least one of two models of runtime invocation, transitory and persistent, may be implemented. In the transitory model, the ACPI AML flow can invoke the runtime binary module, e.g., as an authenticated code module (ACM). The runtime SIC built as an ACM can reference the SIC data from the FIT and perform its initialization action, but unload itself after completion. In this mode, the window of exposure for integrity protection of the runtime SIC is simply during its action execution, but protection of the SIC throughout the life of the platform is not a concern. This complements the trust model of boot-time SIC described earlier which has temporal isolation, namely it runs first and then unloads itself thereafter.

The other model of runtime support is persistent runtime SIC. In this model, the boot-time SIC may have an additional IPL, namely runtime SIC_IPL, that creates an environment and execution context for the runtime code.

The policy input to the runtime SIC can be a synthetic peripheral device (e.g., a peripheral component interconnect (PCI)) that has control/status registers (CSR's) that parameterize the runtime actions, such as a hot-plug memory or other injunction. These CSRs can be published by the runtime persistent SIC and the SIC acts upon their directives. This means that the host platform interface to these capabilities is via the CSR's, so it appears like hardware to the host.

As the trust model is more challenging for the runtime persistent SIC since the execution content is to be protected throughout the life of the platform, a cryptographic memory aperture (CMA) can be used to cover the execution regime of the runtime persistent SIC.

Embodiments may further provide for the update and migration of the SIC. In this way, the SIC can be updated in the field, including migration of a former SIC (e.g., SIC_rev1) to a subsequent SIC (e.g., SIC_rev2). In order to maintain the factory and user configuration, platform owner or manufacturer settings can be preserved, such as mapping SIC_DATA_rev1 to SIC_DATA_rev2as a safe transformation, viz., SIC_DATA_rev2=T (SIC_DATA_rev1). One embodiment of this transformation T( ) can include taking any factory settings of SIC_DATA_rev1 that are not defined in SIC_DATA_rev2 and applying to SIC_DATA_rev2, including the regeneration of an integrity or confidentiality metadata block (e.g., cryptographically re-signing and/or re-encrypting).

Also, for purposes of security, the SIC_IPL and SIC_CODE can be configured to avoid allowing 'updates' to an earlier revision (e.g., applying SIC_CODE/DATA_rev"n−1" to a system with SIC_CODE/CODE_rev"n"). The rationale is that a model of systems deployment is for the processor or chipset manufacturer to respond to a security flaw in revision 'n−1' with the manufacturer releasing the fix in a revision 'n'. Attackers often reverse engineer the fix and try to apply revision 'n−1' updates to systems in the hope of re-introducing the error. This 'anti-rollback' provision in SIC_CODE and SIC_IPL is thus an additional policy to provide protection against such an attack.

Such updates may address later-discovered issues, whether silicon errata, security fixes in responses to product defects reported by customers and found in the field after shipping the processor, or other usability concerns (e.g., power, performance, fixes).

An augmentation of core microcode and the firmware interface table (FIT) may be made to allow for a plurality of SIC_CODE and SIC_DATA blocks. The code and data may include their former cryptographic metadata (for confidentiality of modules, CMA and signature for integrity can be used), in addition to revision identifiers. The latter revisions can be used to orchestrate migrations of former code settings to a latter one, but the revision can also be used so that the code and data can have other access criteria described, such as 'no roll-back to older version' in order to prohibit attacks where an earlier SIC_CODE and SIC_DATA with known security flaws are purposely applied to the system by attackers in order to reintroduce a subsequently addressed vulnerability.

Figure 7:
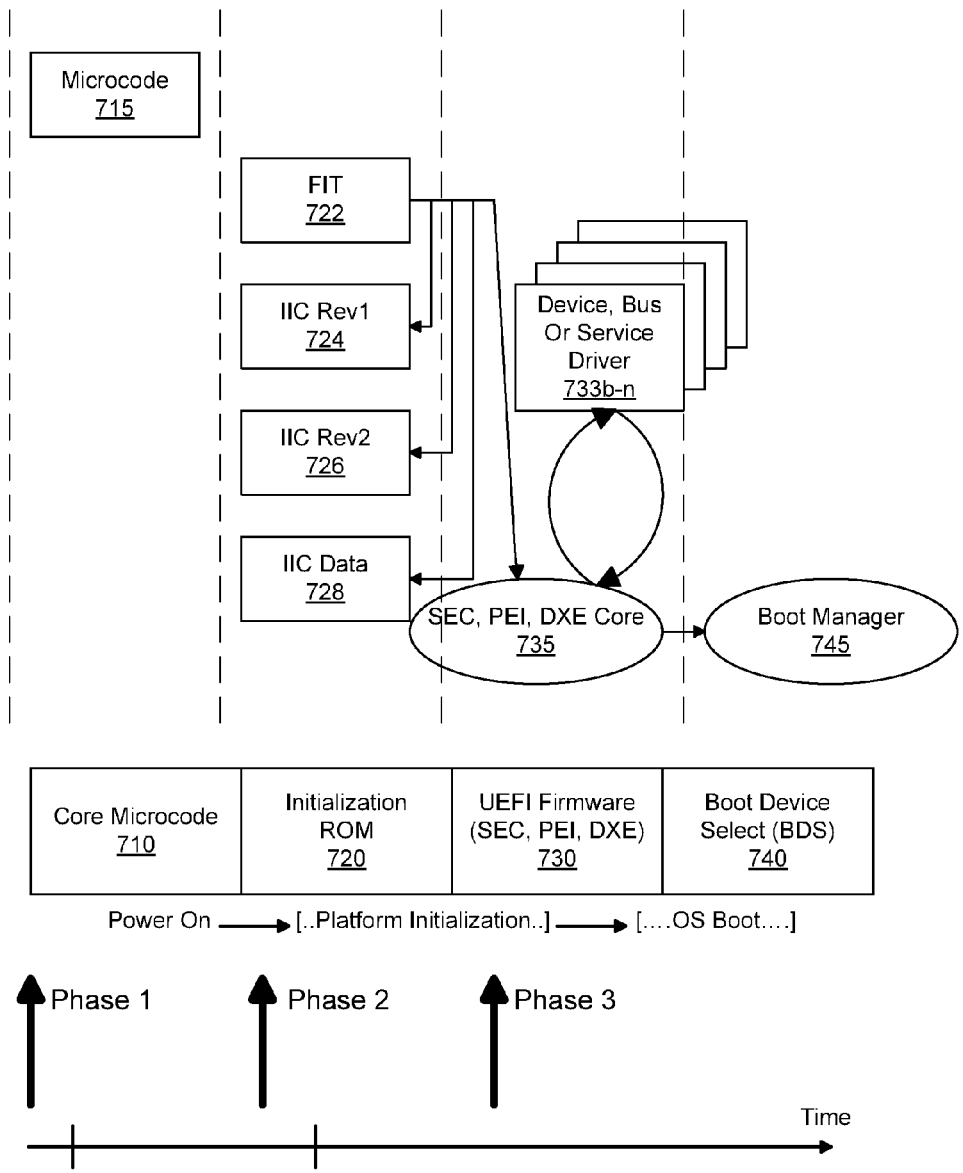
FIG. 7 is a block diagram of a high level flow of boot time in a system in accordance with an embodiment of the present invention.

Referring now to FIG. 7, shown is a block diagram of a high level flow of boot time in a system in accordance with an embodiment of the present invention. As shown in FIG. 7, this boot time flow provides for determining an appropriate one of multiple SICs to execute. As seen, at power on during a first phase, core microcode 710 may begin execution. This core microcode may locate the FIT 722 and authenticate one or more SIC modules 724 and 726. This authentication may take various forms in different embodiments. For example, in some implementations, the authentication may include performing hashes (e.g., SHA-256) and/or cryptographic digital signatures (e.g., Rivest Shamir Adelman (RSA), error correction coding (ECC), digital signature algorithm (DSA)) and ensuring platform ownership by processor hardware by means of comparing the hashes and/or digital signatures against a white-list (allowed) and/or black-list (prohibited) stored in the processor or chipset hardware complex. This phase may conclude with a launch of the SIC with a policy decision on which SIC to use. As seen, based on one or more entries in FIT 722, a selected one of multiple SIC revisions 724 and 726 can be selected along with associated SIC data 728, which as discussed above may include a platform manufacturer data encoding and an end user data encoding, in addition to a processor manufacturer data encoding. Thus control passes to a second phase in which an initialization ROM 720 is executed. By performing conventional third party-sourced activity in silicon integrated code, silicon manufacturer authorized activity occurs, including the policy around upgrading SIC's (e.g., which to use in presence of a plurality of SIC code and data blocks) and shrouding the contents of the activity of the SIC itself.

The initialization ROM may include the SIC or the SIC may be included in an external ROM (with respect to the processor) such as an OEM BIOS memory. Execution of the SIC may enable links associated with the processor, memory and so forth. Control then passes to a third phase which in one embodiment may perform further platform initialization according to UEFI firmware 730 which may include security code, pre-execution initialization, and a DXE core 735. To execute such code, various device, bus or service drivers $733_{b-n}$ may be executed. Note that this UEFI firmware may be implemented in OEM BIOS. Control then passes via a UEFI interface to boot device select (BDS) code 740 executed by a boot manager $744_a$ which in turn enables the OS to boot. Note that the SIC is transitory and only is present during the second phase, enabling spatial and temporal isolation. While not shown in FIG. 7, understand that during runtime this code or a runtime SIC can be accessed, e.g., as discussed above for various dynamic events that can be used for platform management operations.

Figure 8:
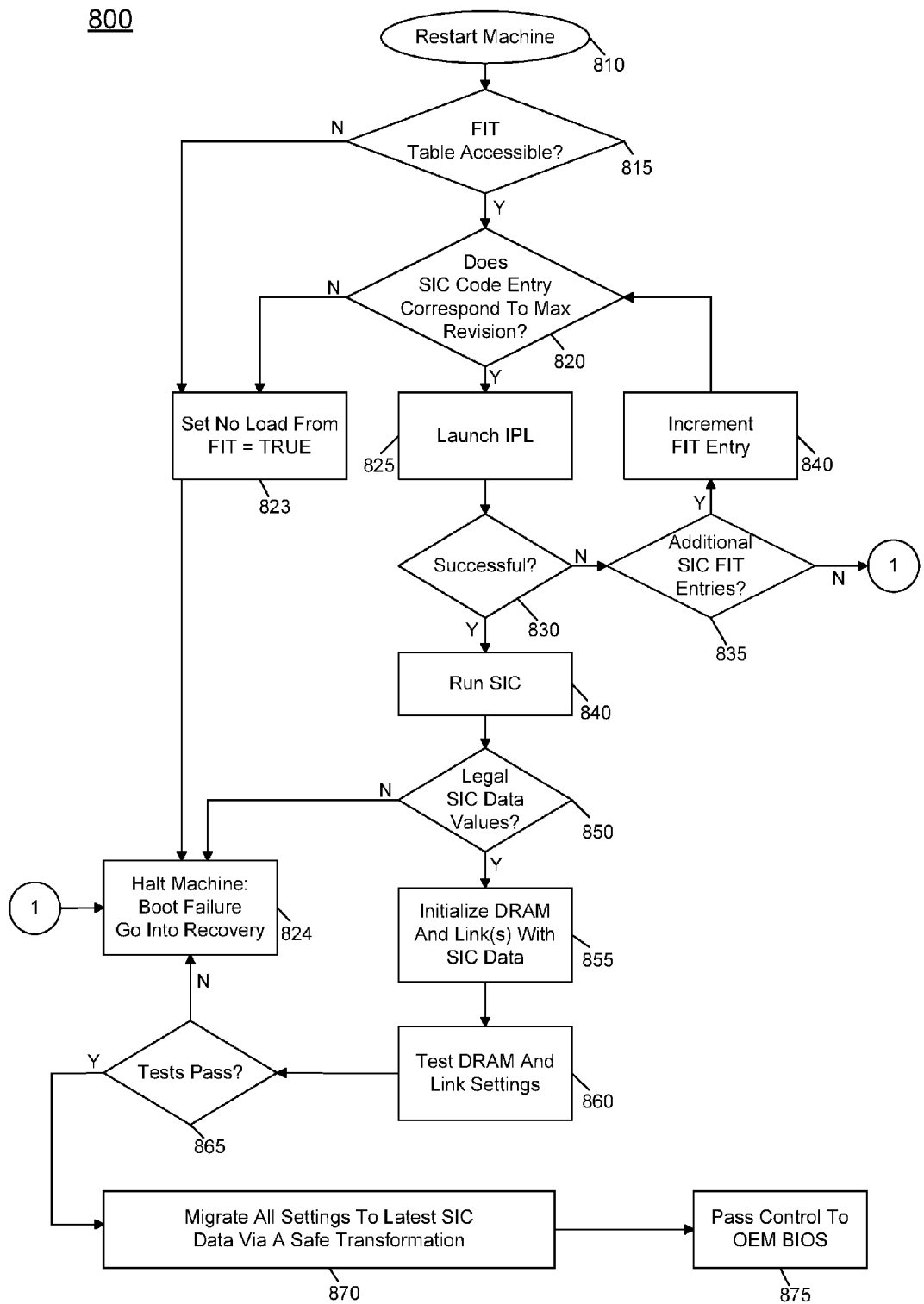
FIG. 8 is a flow diagram of a method of executing transitory SIC code in accordance with an embodiment of the present invention.

Referring now to FIG. 8, shown is a flow diagram of a method of executing SIC code in accordance with an embodiment of the present invention. As seen, method 800 may begin at restart of machine (block 810) via execution of microcode. Specifically, the microcode may determine whether a FIT table is accessible (diamond 815). If not, a flag may be set to indicate that loading from the FIT table is not possible (block 823). Control then passes to block 824 for an entry into a recovery state due to a boot failure.

If instead a FIT table is accessible, it may be determined next whether an SIC code entry corresponds to a maximum revision number (diamond 820). If so, an initial program loader may be launched (block 825). If this IPL is successful (diamond 830) the SIC may be run (block 840). Otherwise if not successful, control passes to diamond 835 to determine whether additional SIC FIT entries are present. If so, control passes to block 840 where the FIT entry may be incremented and control passes back to diamond 820.

Still referring to FIG. 8, when the SIC code is run, control can pass to diamond 850 to determine whether legal SIC data values are present, e.g., based on one or more authentication procedures (diamond 850). If not, control passes back to block 824, discussed above. If a legal data module is present, control passes to block 855 where certain system initialization, including memory initialization and link initialization can be performed using the SIC data module. After initialization, memory and the links may have their settings tested (block 860). Next it may be determined whether the tests pass (diamond 865). If not, recovery may be entered. If instead the tests do pass control passes to block 870, where all settings may be migrated to the latest SIC data via a safe transformation. In one embodiment, such safe transformation may be performed by the SIC_CODE mapping the settings of the earlier SIC_DATA and mapping to the later SIC_DATA, including re-creating the integrity metric of the SIC_DATA block. Control then passes to, e.g., OEM BIOS (block 875). While shown with this particular implementation in the embodiment of FIG. 8, the scope of the present invention is not limited in this regard.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a non-volatile storage to store semiconductor integrated code (SIC) corresponding to platform independent code of a processor manufacturer, the platform independent code to be executed regardless of characteristics of a platform including a processor of the processor manufacturer, the SIC including an embedded processor logic to initialize the processor and at least one communication link that couples the processor to a system memory, and an embedded memory logic to initialize the system memory, wherein the SIC is to be executed responsive to a processor reset and prior to providing control to pre-boot code of an original equipment manufacturer (OEM), wherein the SIC is included in the non-volatile storage, the non-volatile storage including OEM basic input/output system (BIOS), the OEM BIOS dependent on the characteristics of the platform, and a plurality of SIC versions, each associated with a corresponding SIC data module, wherein an initial program loader (IPL) is to select one of the plurality of SIC versions and SIC data modules to launch.

2. The apparatus of claim 1, further comprising an initial program loader (IPL) to load the SIC, the IPL to be launched from microcode of the processor, wherein the IPL is to authenticate the SIC and then to launch the SIC.

3. The apparatus of claim 2, wherein the IPL is to access a firmware interface table (FIT) having an entry including a pointer to point to a location of the SIC.

4. The apparatus of claim 3, wherein the SIC is provided as a binary to the OEM for inclusion in the non-volatile storage.

5. The apparatus of claim 1, wherein the SIC data module includes processor manufacturer data provided by the processor manufacturer, OEM data provided by the OEM, and end user data provided by an end user, wherein the OEM data and the end user data is platform dependent.

6. The apparatus of claim 5, wherein the OEM data is trusted data that is signed by the processor manufacturer prior to insertion into the non-volatile storage.

7. The apparatus of claim 1, wherein the non-volatile storage is of a processor package including a plurality of cores, at least one microcode store, and an integrated memory controller.

8. The apparatus of claim 1, wherein the SIC is to sequester a portion of the system memory for the processor, wherein the sequestered portion is to be invisible to an operating system.

9. The apparatus of claim 8, wherein the processor is to store a binary translator in the sequestered portion.

10. At least one non-transitory computer-readable medium having stored thereon instructions, which if performed by a machine cause the machine to perform a method comprising:
receiving an indication in a system during runtime that at least one component is to be dynamically incorporated into the system;
triggering a power management operation via operating system power management (OSPM) code responsive to the indication;
invoking semiconductor integrated code (SIC) from the OSPM code and without entry into a system management mode, the SIC corresponding to platform independent code of a processor manufacturer, and executing initialization of the at least one component using the SIC, wherein the SIC comprises a plurality of SIC versions, each associated with a corresponding SIC data module; and
unloading the SIC and returning to the OSPM, wherein the SIC is provided as a binary module by the processor manufacturer to an original equipment manufacturer (OEM) of the system.

11. The at least one non-transitory computer-readable medium of claim 10, further comprising instructions to enable the system to access a SIC data module using the SIC, based on an entry in a firmware interface table (FIT).

12. The at least one non-transitory computer-readable medium of claim 11, further comprising instructions to enable the system to execute the initialization using information in the SIC data module.

13. The at least one non-transitory computer-readable medium of claim 10, further comprising instructions to enable the system to, the SIC to perform initialization of a processor and memory of the system on system startup.

14. The at least one non-transitory computer-readable medium of claim 13, further comprising instructions to enable the system to, after performing the initialization, store the SIC in a sequestered portion of the memory setup by the SIC.

15. The at least one non-transitory computer-readable medium of claim 14, further comprising instructions to enable the system to invoke the SIC stored in the sequestered portion.

16. The at least one non-transitory computer-readable medium of claim 10, further comprising instructions to enable the system to synthesize a peripheral device address in a chipset and invoke the SIC via an access to the peripheral device address by the OSPM code.

17. A system comprising:
a processor including a plurality of cores, a microcode storage, and a memory controller;
a peripheral controller coupled to the processor;
a trusted platform module coupled to the processor; and
a non-volatile memory to store semiconductor integrated code (SIC) corresponding to platform independent code of a manufacturer of the processor, the platform independent code to be executed regardless of characteristics of the system, the SIC including an embedded processor logic to initialize the processor and at least one link that couples the processor to a system memory, and an embedded memory logic to initialize the system memory, wherein the SIC is to be executed responsive to a processor reset and prior to providing control to an original equipment manufacturer (OEM) basic input/output system (BIOS) firmware included in the non-volatile memory, the OEM BIOS dependent on the characteristics of the system, wherein the SIC is selected by an initial program loader (IPL) from a plurality of SIC versions stored in the non-volatile memory, each of the plurality of SIC versions associated with a corresponding SIC data module; and
the system memory coupled to the processor.

18. The system of claim 17, further comprising the IPL to authenticate and then launch the SIC, the IPL to be launched from microcode of the processor stored in the system memory.

19. The system of claim 18, wherein the SIC is to sequester a portion of the system memory for exclusive use by the processor during system operation, wherein the sequestered portion is to be invisible to an operating system.

* * * * *